(12) United States Patent
Fujikawa et al.

(10) Patent No.: US 7,804,417 B2
(45) Date of Patent: Sep. 28, 2010

(54) INTERACTIVE LIGHTING SYSTEM

(75) Inventors: Megumi Fujikawa, London (GB); Job Rutgers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 329 days.

(21) Appl. No.: 11/576,549

(22) PCT Filed: Sep. 30, 2005

(86) PCT No.: PCT/IB2005/053226

§ 371 (c)(1),
(2), (4) Date: Apr. 3, 2007

(87) PCT Pub. No.: WO2006/038169

PCT Pub. Date: Apr. 13, 2006

(65) Prior Publication Data

US 2008/0122635 A1     May 29, 2008

(30) Foreign Application Priority Data

Oct. 5, 2004    (EP)  ................................ 04104882

(51) Int. Cl.
*G08B 5/00*    (2006.01)
(52) U.S. Cl. ................ 340/815.4; 340/3.51; 340/815.66
(58) Field of Classification Search ............... 340/815.4, 340/825, 3.1, 3.5, 3.51, 815.45, 815.42, 815.43, 340/815.44, 815.66
See application file for complete search history.

(56) References Cited

U.S. PATENT DOCUMENTS

| | | | | |
|---|---|---|---|---|
| 5,418,525 | A  * | 5/1995 | Frei et al. ..................... | 340/5.6 |
| 6,854,869 | B1 | 2/2005 | Fernandez | |
| 7,167,575 | B1 * | 1/2007 | Nichani et al. ............... | 382/103 |
| 7,261,436 | B2 * | 8/2007 | Haugaard et al. ........... | 362/225 |
| 2004/0090787 | A1 | 5/2004 | Dowling et al. | |
| 2005/0237733 | A1 * | 10/2005 | Laski et al. ................. | 362/147 |
| 2008/0109397 | A1 * | 5/2008 | Sharma et al. ................ | 707/1 |

FOREIGN PATENT DOCUMENTS

| | | |
|---|---|---|
| EP | 652690 | 5/1995 |
| JP | 200185170 A | 3/2001 |
| WO | 0182657 | 11/2001 |
| WO | 2004006578 A2 | 1/2004 |
| WO | 20040006570 | 1/2004 |
| WO | 2004049767 A1 | 6/2004 |
| WO | WO 2004/049767 * | 6/2004 |
| WO | 2005022963 | 3/2005 |

* cited by examiner

*Primary Examiner*—Daniel Previl

(57) ABSTRACT

A lighting system and method for providing a particular lighting pattern from a predetermined set of lighting patterns are disclosed. The system comprises a presence detector for detecting a presence of a person in an area, a timer for measuring a duration of the presence, a pattern selector for selecting the particular lighting pattern from the predetermined set of lighting patterns based on the presence and the duration, and a plurality of adjustable light sources for applying the particular lighting pattern.

6 Claims, 16 Drawing Sheets

Figure 1:
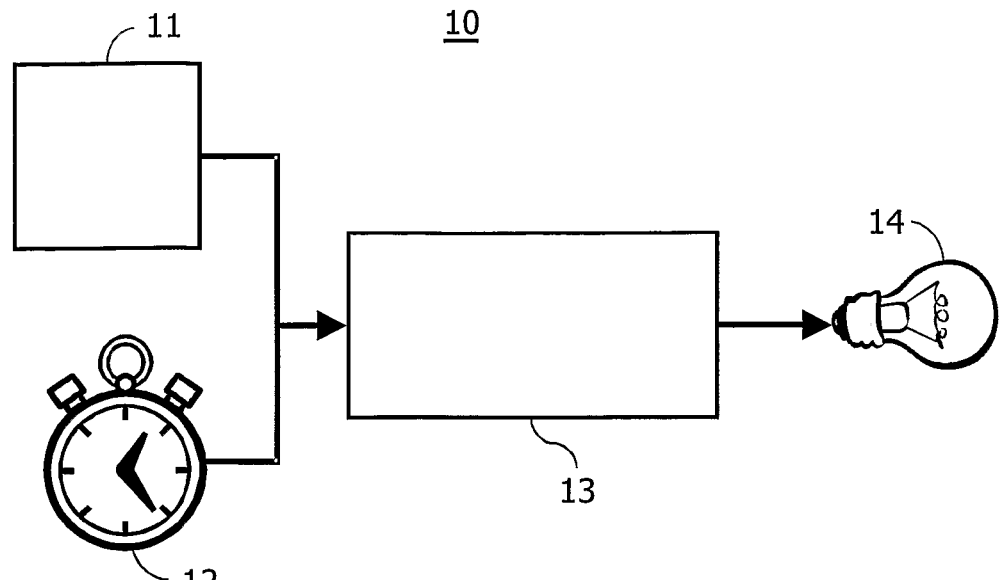

| action | reaction | | interaction/effects on the atmosphere |
|---|---|---|---|
| the person has been sitting on chair 2f or along while | chair 1 | • as ide facing chair2 starts glowing in low intensity and slow speed with yellow light<br>• glowing up and dimming down randomly with blue-white light | signifies the effect of the human existence on the area by making other chair react to the person sitting on the chair 2 |
| | chair 2 | • speed of pulses gets slower and its intensity becomes lower with yellow light | creating relaxed atmosphere by smoothing down the pulse rates of chair2 because the person has been sitting on the chair for along while |
| | chair 3 | • as ide facing chair2 starts glowing in low intensity and slow speed with yellow light<br>• glowing up and dimming down randomly with blue-white light | |

FIG.7-2

| action | reaction | | interaction/effects on the atmosphere |
|---|---|---|---|
| another person sits on chair 1 | chair 1 | ·glows up and pulses in high intensity and speed with yellow light | signifies another human existence in the area |
| the person has been sitting on chair 2f or al onger while | chair 2 | ·speed of pulses gets slower and its intensity becomes lower with yellow light | the high intensity and speed of pulses on the chair1 imply the busyness of the area |
| | chair 3 | ·the side facing chair2 pulses faster and brighter with yellow light<br>·glowing up and dimming down randomly with blue-white light | |

FIG.7-3

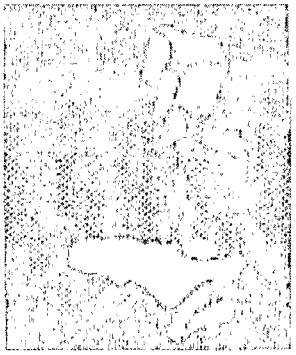

| action | reaction | | interaction/effects on the atmosphere |
|---|---|---|---|
| | chair 1 | • speed of pulses gets slower and its intensity becomes lower with yellow light | |
| the person sat on chair 2l eft | chair 2 | • stops pulsing with yellow light, and the yellow light slowly fades down, except the side facing chair1<br>• the side facing chair1 pulses faster and brighter with yellow light<br>• starts glowing up and down randomly with blue-white light | creating relaxed atmosphere by smooting down the pulse rates of chair1 because the person has been sitting on the chair for al ong while |
| the person has been sitting on chair 1f or as hort while | chair 3 | • the side facing chair2 stops pulsing with yellow light, and the yellow light slowly fades down<br>• glowing up and dimming down randomly with blue-white light | implies previous human existences on the chair2 |

FIG.7-4

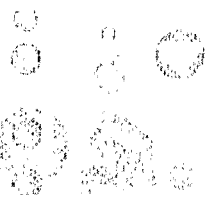

interaction/effects on the atmosphere

| action | reaction | |
|---|---|---|
| the person sat on chair 1 left | chair 1 | • stops pulsing with yellow light, and the yellow light slowly fades down<br>• starts glowing up and down randomly with blue-white light |
| | chair 2 | • the side of chair2 facing chair 1s tops pulsing with yellow light, and the yellow light slowly fades down<br>• glowing up and dimming down randomly with blue-white light |
| | chair 3 | • the yellow light on the side facing chair2 is slowly fading down<br>• glowing up and dimming down randomly with blue-white light | implies previous human existences in the area

FIG.7-5

| action | reaction | interaction/effects on the atmosphere |
|---|---|---|
| nobody sit for a short while | chair 1 | •the yellow light is slowly fading down<br>•glowing up and down randomly with blue-white light | implies previous human existences in the area<br><br>dimness of the yellow light on each chair corresponds to the duration of human absence on the chairs and in the area |
| | chair 2 | •the yellow light on the side facing chair1 is slowly fading down<br>•glowing up and down randomly with blue-white light | |
| | chair 3 | •the yellow light on the side facing chair2 is slowly fading down<br>•glowing up and down randomly with blue-white light | |

FIG.7-6

| | reaction | interaction/effects on the atmosphere |
|---|---|---|
| action | | |
| chair 1 | glowing up and down randomly with blue-white light | show quietness of the area but keeps the chairs busy to attract people as if these chairs are talking to people |
| nobody sit for a long while | | |
| chair 2 | glowing up and down randomly with blue-white light | |
| chair 3 | glowing up and down randomly with blue-white light | |

FIG.7-7

|  | scene 1 | scene 2 |
|---|---|---|
| action | | |
| atmosphere visualization | | |
| analysis/ explanation from the atmosphere visualization | nobody has been sitting for a long while | person A just sat on a chair |
| level of busyness | | |

FIG. 8-1

| | scene 3 | scene 4 |
|---|---|---|
| action | | |
| atmosphere visualization | | |
| analysis/ explanation from the atmosphere visualization | person A has been sitting on a chair for a long while | person A has been sitting on a chair for a long while person B just sat on a chair |
| level of busyness | | |

FIG. 8-2

| | | |
|---|---|---|
| action | | |
| atmosphere visualization | | |
| analysis/ explanation from the atmosphere visualization | scene 1<br><br><br><br>nobody has been sitting for a long while | scene 1<br><br><br><br>nobody has been sitting for a long while |
| level of busyness | | |

FIG. 8-4

INTERACTIVE LIGHTING SYSTEM

FIELD OF THE INVENTION

The invention relates to a system for providing a particular lighting pattern.

The invention further relates to a method for providing a particular lighting pattern and to a computer program product.

BACKGROUND OF THE INVENTION

Most of the dynamics in natural daylight are rather slow and gradual. For example, the blue sky in the afternoon changes into a warm glow in the evening and into darkness at night. The brightness of sunlight, as well as its color and direction, varies over time. The slow and gradual changes contribute to a rich experience of natural light. In contrast, artificial light is often considered to be dull, due to the static and constant quality of light. Therefore, more and more qualities of electric light sources can now be changed over time electronically. For example, dimming the light output of a source is the most basic of these parameters. Variation in color temperature is an option that is already applied in practice. The Philips 'Carpe Diem' system, for example, applies a pre-programmed cycle of variations in brightness and color temperature in order to simulate a natural daylight cycle.

However, within such artificial light installations these light quality changes are either fixed or pre-programmed. It is a disadvantage of the known systems that there is no or only little interaction between people's activities and the provided artificial light. Systems are known wherein artificial light is activated by simple presence detectors (photo cells) that switch lamps either on or off. Such systems, however, do also not provide an intuitive and natural interaction with people's activities.

OBJECT OF THE INVENTION

It is an object of the invention to provide a lighting system which intuitively and naturally interacts with people's activities.

SUMMARY OF THE INVENTION

A first aspect of the invention provides a lighting system for providing a particular lighting pattern from a predetermined set of lighting patterns, the system comprising a presence detector for detecting a presence of a person in an area, a timer for measuring a duration of the presence, a pattern selector for selecting the particular lighting pattern from the predetermined set of lighting patterns based on the presence and the duration, and a lighting means for applying the particular lighting pattern.

A second aspect of the invention provides for a method for providing a particular lighting pattern from a predetermined set of lighting patterns, the method comprising the steps of monitoring a presence of a person in an area, monitoring a duration of the presence, selecting the particular lighting pattern from the predetermined set of lighting patterns based on the presence and the duration, and providing the particular lighting pattern.

By monitoring the presence of the person as well as the duration of said presence, a new parameter becomes available for triggering changes in the lighting pattern provided by the lighting system. With the system of the invention, a large variety of lighting patterns is available for being applied to the lighting means in accordance with the current situation. As a consequence the applied lighting pattern might change during the presence of the person.

In a special embodiment the lighting means are operative to apply the particular lighting pattern to the area. Thereby an interactive lighting system is provided which adapts the lighting pattern in an area to the human activity in said area.

In an embodiment according to the first aspect of the invention, the presence detector is arranged for detecting a number of persons being present, the number being larger than one, the timer is arranged for measuring a duration of the number of persons being present and the pattern selector is arranged for selecting the particular lighting pattern further based on the duration of the number of persons being present. For example, at an office a 'discussion pattern' is selected when more than four people are present and a 'work pattern' when only one person is present. In a special embodiment the number is two.

In another embodiment according to the first aspect, the system further comprises an orientation detector for measuring an orientation of the at least one person and wherein the pattern selector is arranged for selecting the particular lighting pattern further based on the orientation. For example, the lights in front of the person may be brighter than the lights behind the person. Further, when two people are facing each other at the office a 'conversation pattern' may be selected and when those two people do not face each other a 'work pattern' may be selected.

In a preferred embodiment according to the first aspect of the invention the timer is arranged for further measuring an actual time and wherein the pattern selector is arranged for selecting the particular lighting pattern further based on the actual time. In this embodiment, the color temperature of the applied light may, for example, follow a natural daylight cycle, while the presence of one or more people triggers specific brightness patterns.

In yet another embodiment according to the first aspect, the system further comprises an input for receiving a further lighting pattern and means for including the further lighting pattern in the set of lighting patterns. This enables a user or professional light designer to create and adjust lighting pattern in accordance with the user's preferences.

These and other aspects of the invention are apparent from and will be elucidated with reference to the embodiments described hereinafter.

LIST OF FIGURES

Figure 2:
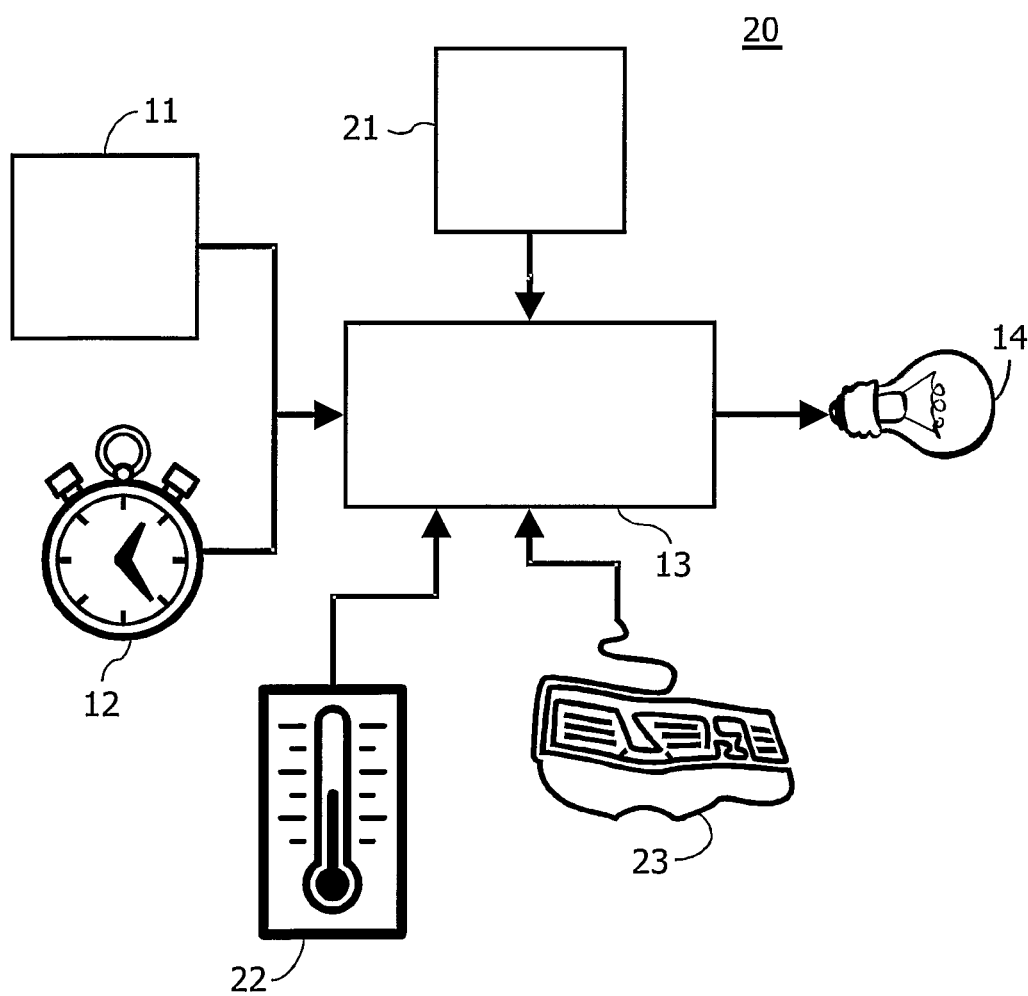
Figure 3:
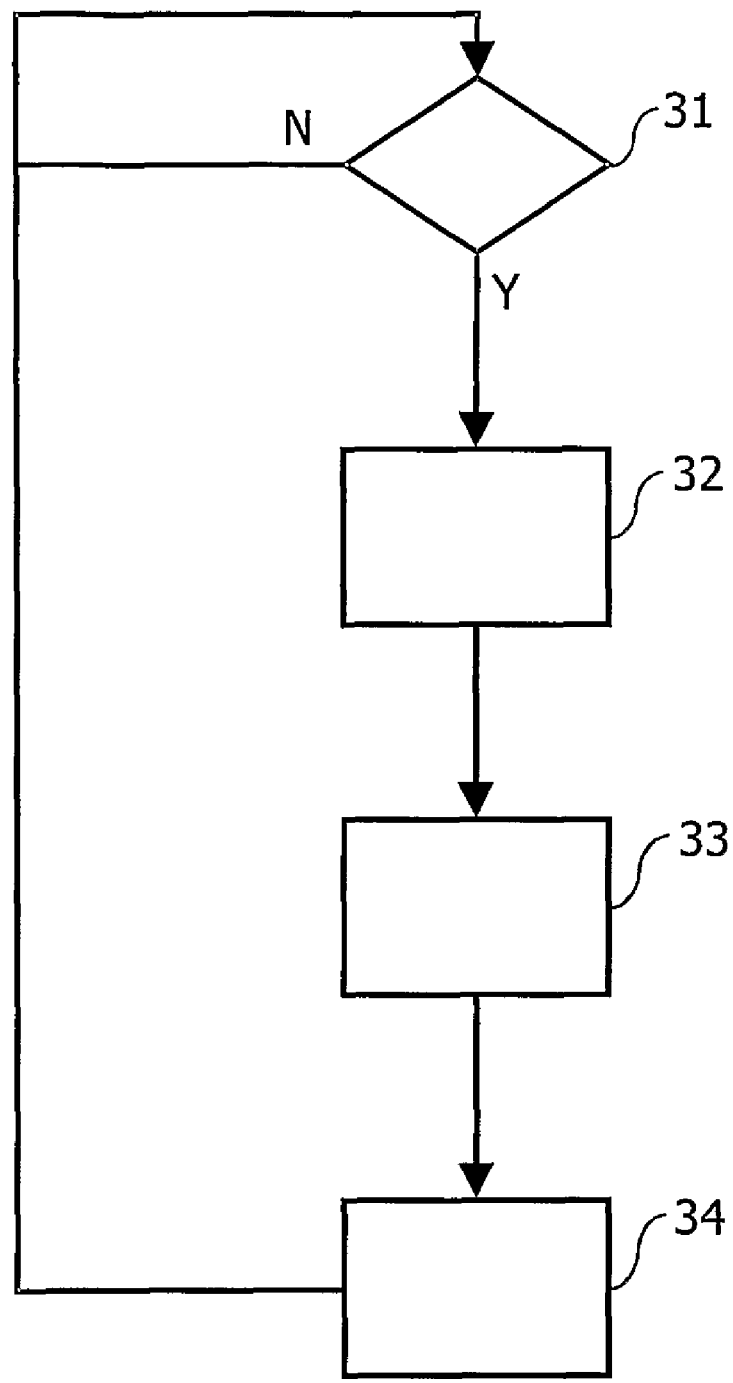
Figure 4:
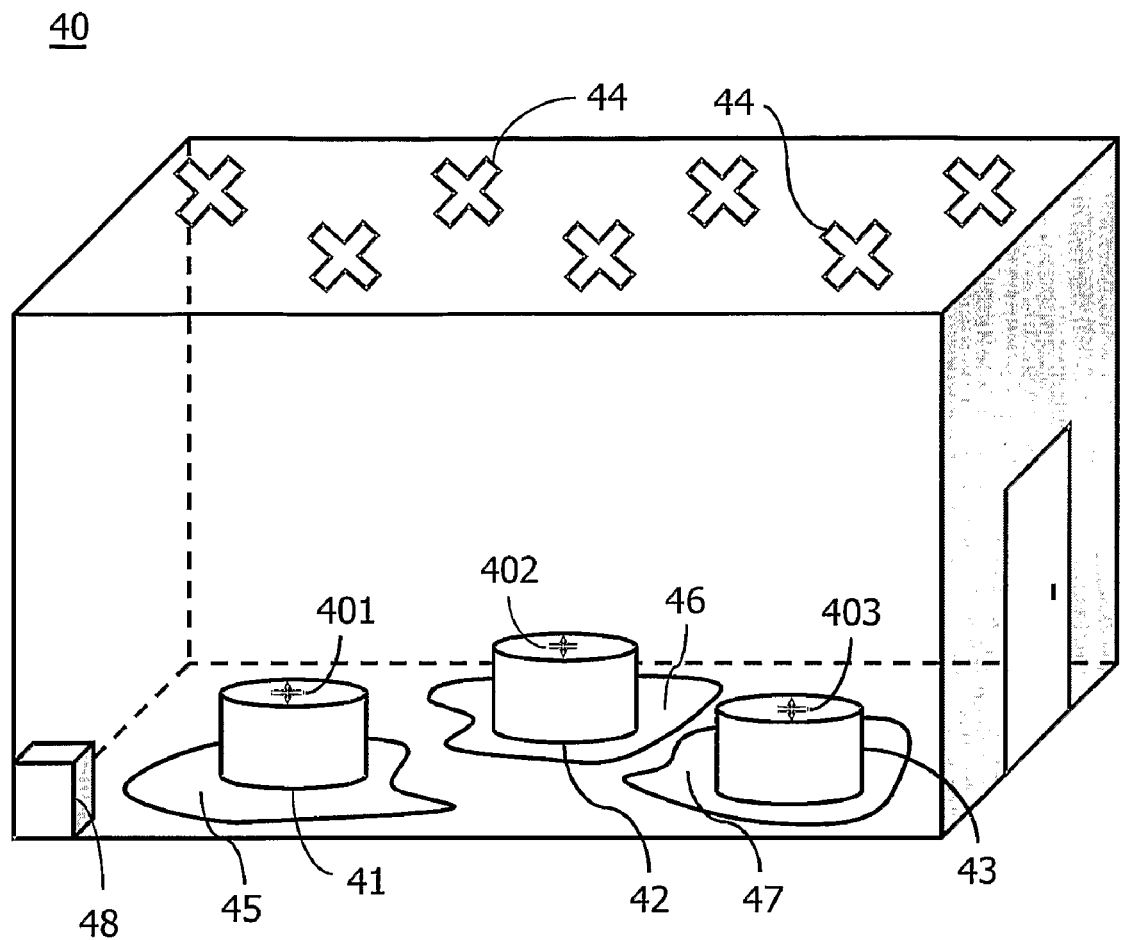
Figure 5:
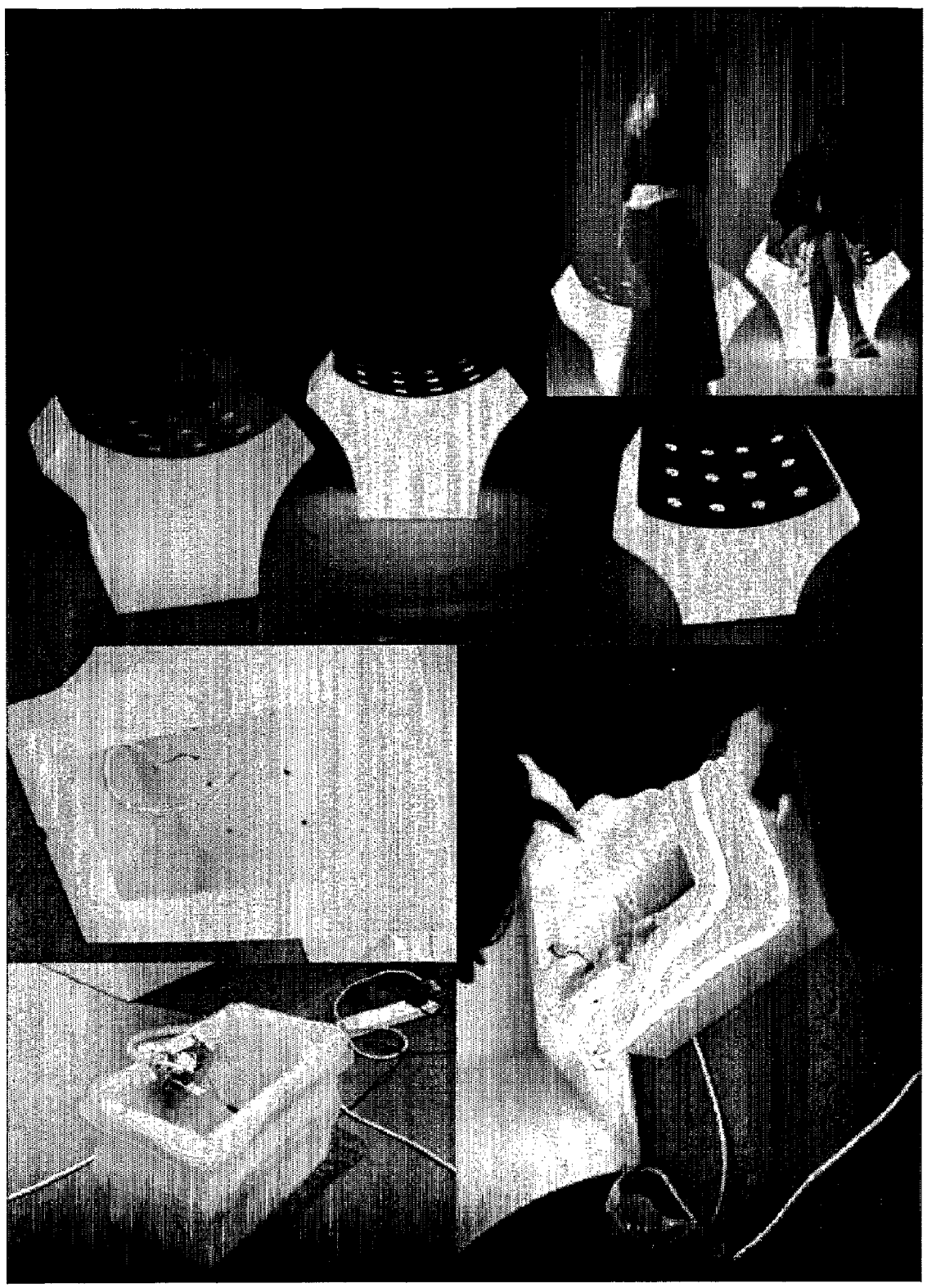
Figure 6:
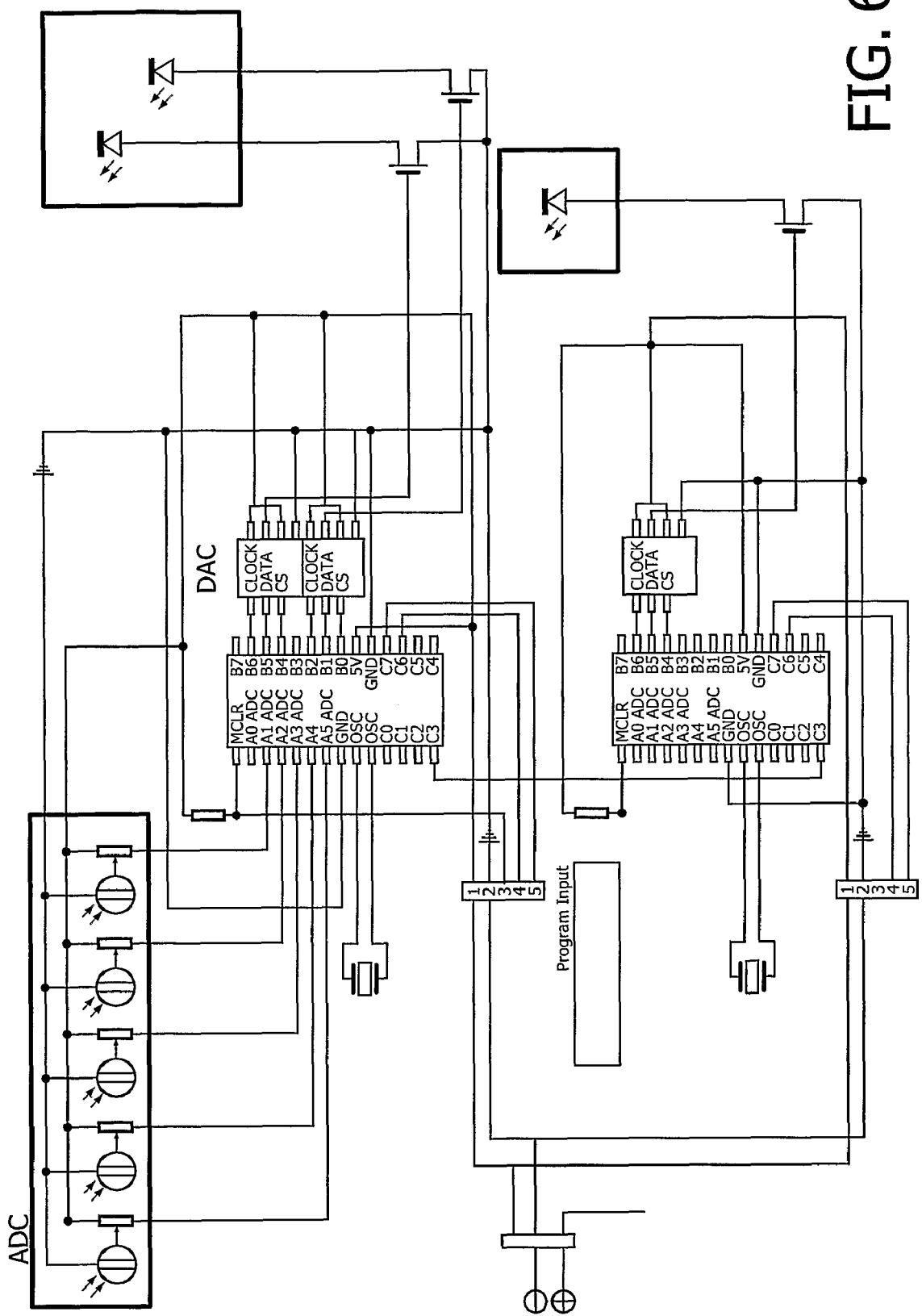
Figures 1, 7:
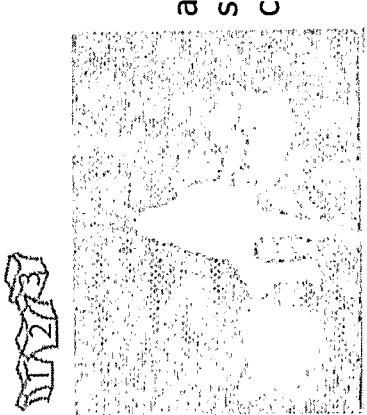
Figures 3, 8:
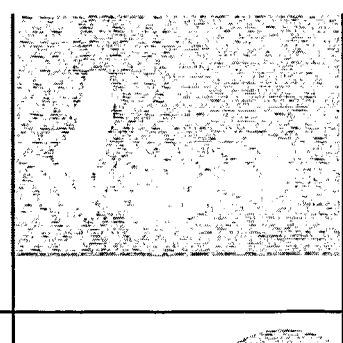

In the drawings:

FIG. 1 schematically shows an embodiment of the lighting system according to the invention, FIG. 2 schematically shows another embodiment of the lighting system according to the invention, FIG. 3 shows a flow diagram of the method according to the invention, FIG. 4 shows an exemplary room, wherein a system according to the invention has been installed, FIG. 5 shows an overview of an embodiment of the invention in lighting furniture, FIG. 6 shows the hardware configuration of microchip, LEDs and presence sensors, FIG. 7 illustrates some of the rules of time measurement and social patterns, and FIG. 8 shows a number of lighting patterns from which a selection is made.

DETAILED DESCRIPTION OF THE INVENTION

FIG. 1 schematically shows an embodiment of the lighting system 10 according to the invention. The system 10 comprises a presence detector 11, a timer 12, a pattern selector 13 and lighting means 14. The presence detector 11 may, for example, be a photosensitive diode or a pressure detector. The presence detector 11 may, for example, be integrated in or attached to furniture, walls, floors or ceilings. Alternatively, the presence detector 11 may comprise a digital photo camera or video camera and use object recognition software for detecting a presence of a person. The pattern selector 13 may be implemented in hardware or software. The pattern selector 13 may be implemented in, for example, a micro chip, [PIC16F876], which is programmed with PicBasic Pro Compiler of microEngineering labs. Alternatively a general purpose processor may be used and the pattern selector is completely implemented in software. The pattern selector 13 is coupled to the presence detector 11, the timer 12 and the lighting means 14. The lighting means 14 may comprise any number and type of available adjustable light sources. Preferably, the lighting means can not only be turned on or off, but also light color and brightness are controllable. For this purpose, a set of differently colored LEDs is very suitable.

The pattern selector 13 uses rules for selecting the particular pattern. The input for the rules comes from the presence detector 11 and the timer 12. The rules define which lighting pattern is to be applied for which input. For example, when a person leaves his office and no person has been detected to be present for more than a few minutes, the lighting means are partially turned off and/or the brightness is reduced. After half an hour the lights may be turned off completely. As soon as a person has been detected, a light is turned on again. In a preferred embodiment, the presence detector 11 is arranged for detecting a number of persons. When a second person enters the office, the lighting pattern may change from a 'work pattern' to a 'discussion pattern' by, for example, turning off a desk light and changing the color temperature of the other lights.

Depending on the number of people present and on the amount of time these people have been present (or not present) an appropriate lighting pattern is selected and applied. The lighting pattern defines the amount and the quality of light. Qualities of the light which, for example, may be varied are brightness, color temperature and the directivity of the light.

FIG. 2 shows an advanced embodiment of a lighting system 20 according to the invention. This lighting system 20 comprises all features of the system of FIG. 1, an orientation detector 21, a thermometer 22 and a user interface 23. The orientation detector 21 is operative to detect an orientation of people with respect to each other or an orientation of people with respect to the room. The orientation detector 21 may, for example, be realized as a digital camera with object recognition software or may detect a position of a person's feet with respect to a position of a chair, the person sits on. The pattern selector 13 may, for example, select a 'conversation pattern' when two or more people are facing each other, different colors of light may be directed at different groups of people facing each other in a public area or, in a museum, the brightness of light illuminating a particular object may be increased when a person looks at it. The thermometer 22 may be placed outside, but may also be used for measuring a temperature in the area to which the lighting pattern is applied. For example, the color temperature of the light may be changed according to the outside temperature. Also other measurements of external factors may influence the pattern selection for increasing the dynamic nature of the system. The user interface 23 may comprise input means like a keyboard or a mouse and provides a user the ability to create new rules and new lighting patterns and to adjust existing ones. This allows a user to customize the system to his own taste and to the situation it is used in.

FIG. 3 shows a flow diagram of the method 30 according to the invention. At a person detection step 31 the presence detector is used for checking whether a person is present. In a preferred embodiment, also a number of present people is detected in this detection step 31. If no presence has been detected this step 31 is repeated until there is a person present. When one or more persons are present, the duration of these presences is checked in timing step 32. Depending on the presence and the duration, a pattern is selected in step 33. Thereafter, the selected pattern is applied to the lighting means in apply step 34. Then, the method 30 is repeated by returning to the person detection step 31.

FIG. 4 shows an exemplary room 40, wherein a system according to the invention has been installed. The system comprises three seats 41, 42 and 43 wherein presence detectors 401, 402 and 403 are integrated. The presence detectors 401, 402 and 403 are coupled to the computer 48 which runs the pattern selection software. The coupling is preferably realized wireless. The computer 48 may alternatively be incorporated in one of the seats 41, 42 and 43. If the computer 48 is incorporated in a seat 41, 42, 43, the seat 41, 42, 43 may comprise a display screen and a keyboard or other type of input device for enabling a user to add or adjust lighting patterns or pattern selection rules. Alternatively, a user may couple a keyboard and/or display to the seat 41, 42, 43 for adding or adjusting lighting patterns or pattern selection rules. Also a remote control may be used instead of the keyboard. Such a remote control may comprise a display. The pattern selection software selects a lighting pattern, based on information from the presence detectors 41, 42 and 43. Lighting means (see e.g. FIG. 5) in the seats 41, 42, 43, lighting means 44 on the ceiling and lighting means 45, 46, 47 on the floor are coupled to the computer 48. The coupling may be wired or wireless or a combination of both. The computer 48 applies the selected pattern to the lighting means 44, 45, 46, 47.

FIG. 5 shows an overview of an embodiment of the invention in lighting furniture. This embodiment includes the reactive measurement of (1) social patterns and (2) presence patterns over time within the shape of illuminated seating units that glow, dim, flash and change color in reaction to the grouping of people sitting on them at different times of the day. Within the chairs, presence sensors are embedded. These are in a grid of circles in the top surface. The software embedded in the chairs registers how long people sit on which chairs. Based on a set of rules, the software then creates a number of dynamic LED light effects.

FIG. 6 shows the hardware configuration of microchip, LEDs and presence sensors in the chairs. The LEDs and software are controlled by a programmable hardware configuration. A micro chip, [PIC16F876], is programmed with PicBasic Pro Compiler of microEngineering labs. The microchip is wired to presence sensors and to a set of yellow LEDs and blue LEDs.

The software that is embedded in the microchip operates a number of 'rules'. These rules are an important aspect of the invention. They are defined by the parameters of social patterns and time. For instance, a simple rule is that when somebody activates the presence sensor by sitting on the chair, the chairs illuminate. For instance, the system measures the co-presence of people, making a differentiation whether one, two or three people are sitting. Based on the detection of the amount of people, the rules cue a set of dynamic light effects.

FIG. 7 illustrates some of the rules of time measurement and social patterns. It is shown how they are related to a number of ambient light effects, also called lighting patterns. Each of these 'rules' is related to a number of light effects that appear in the three chairs. Together, the rules cause an ambient, indirect interaction with lighting systems. In a particular embodiment, the following durations have been chosen for the periods indicated in the rules:

| | |
|---|---|
| short while | 3 minutes |
| medium while | 7 minutes |
| long while | 10 minutes |
| longer while | 17 minutes |

FIG. 8 shows a number of lighting patterns from which a selection is made. This selection is made on the basis of the presence of one or more persons and on the basis of the duration of any such presence.

A further embodiment of the lighting system according to the invention is in lighting an office. In office environments, the application is that a certain pattern of light dynamics is activated by the activities of its employees. A number of distributed sensors measure the number of people and the temporal character or their activities within their office space. The lighting patterns may be produced by traditional office lamps, now controlled by the system of the invention. The lighting dynamics increases a sense of well being by creating less dull light (than monochrome and single intensity light) and increases productivity by specially designed light dynamics. There is a direct link to people's physical activities within the space. In the course of the day, the lighting dynamics changes in relation to the interactions of the employee with other employees, time spent behind his desk and in general the time passing of the day.

An example of the rules in this embodiment is where one single employee gets to his office desk in an open office environment in the early morning and the sensors register his presence. In this example, a rule is that the first 5 minutes of his presence (in the morning), the lighting patterns create a 'wake up, get energized' light effect. After 5 minutes, the light switches to a calmer light setting that slowly changes, increasing the productivity of the employee. If one or two colleagues stop at the employee's desk, the system produces a lighting pattern that is more socially suitable, producing a quality of light that gives a nice quality of lighting shining on people's faces, more subdued than the brighter lighting that is, necessary for working.

The invention can be applied in commercial office lighting, domestic lighting and public lighting system. The invention can be embedded in the software that regulates the qualities of light in color changing LED products.

In the office domain, application of the invention is possible in the general lighting system to create a dynamic general lighting quality that stimulates productivity and increases the well being of the employees. In this application, a light designer or light installer defines a range of light effects, the so-called lighting patterns, and fine-tunes the parameters of interaction based on the needs of the organization and its employees. The benefit for employees is a richer, dynamic light experience that evokes the experience of natural light outside.

In a domestic light application, the invention can be used in stand-alone light product-systems to create a dynamic light quality that increases the feeling of well being. In this application, the user can choose from a pallet of different parameters configurations via an on-screen interface or interface integrated into the product.

In public lighting, application of the invention can be used in the general public lighting systems to create a dynamic general lighting quality that stimulates the feeling of well being in the public arena. In this application, a light designer or light installer would define a range of light effects and fine-tune the parameters of interaction based on the needs of the public of the site.

Future applications could include the further development of the rules and of sensor precision. For instance the measurement of the orientation of people with respect to each other rather then just measuring their presence alone would refine social patterns measurement. By memorizing the interactions and pattern matching the system could incorporate certain intelligence and becomes a self-learning ambient environment.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting system for providing a particular dynamic lighting pattern from a predetermined set of dynamic lighting patterns, the system comprising:
    a presence detector for detecting a presence of a plurality of persons at a location;
    a timer for measuring a duration of the presence of each individual of said plurality of said persons;
    a pattern selector for selecting the particular dynamic lighting pattern from the predetermined set of dynamic lighting patterns based on the presence and on the duration of each of said plurality of persons, wherein the particular dynamic lighting pattern comprises a series of light effects;
    a plurality of adjustable light sources for applying the particular dynamic lighting pattern to the location during the presence of each of said persons;
    wherein said pattern selector includes a plurality of rules reactive to measurement of social patterns and presence patterns over time as determined by said timer, said rules operable on said adjustable light sources based upon the number of said plurality of persons and the temporal character of each of said plurality of persons activities.

2. A lighting system according to claim 1, wherein said presence detector is arranged for detecting said plurality of persons being present, the timer is arranged for measuring a duration of the number of persons being present, and the pattern selector is arranged for selecting the particular dynamic lighting pattern further based on said social patterns and presence patterns.

3. A lighting system according to claim 1, further comprising an orientation detector for measuring an orientation of each of said persons and wherein the pattern selector is arranged for selecting the particular dynamic lighting pattern further based on said orientation.

4. A lighting system according to claim 1, wherein the timer is arranged for further measuring an actual time wherein the pattern selector is arranged for selecting the particular dynamic lighting pattern further based on the actual time.

5. A lighting system according to claim 1, further comprising an input for receiving a further dynamic lighting pattern and means for including the further dynamic lighting pattern in the set of dynamic lighting patterns.

6. A lighting system according to claim 1, wherein the particular dynamic lighting pattern defines a brightness, and/or color temperature, and/or directivity of light.

* * * * *